UNITED STATES PATENT OFFICE.

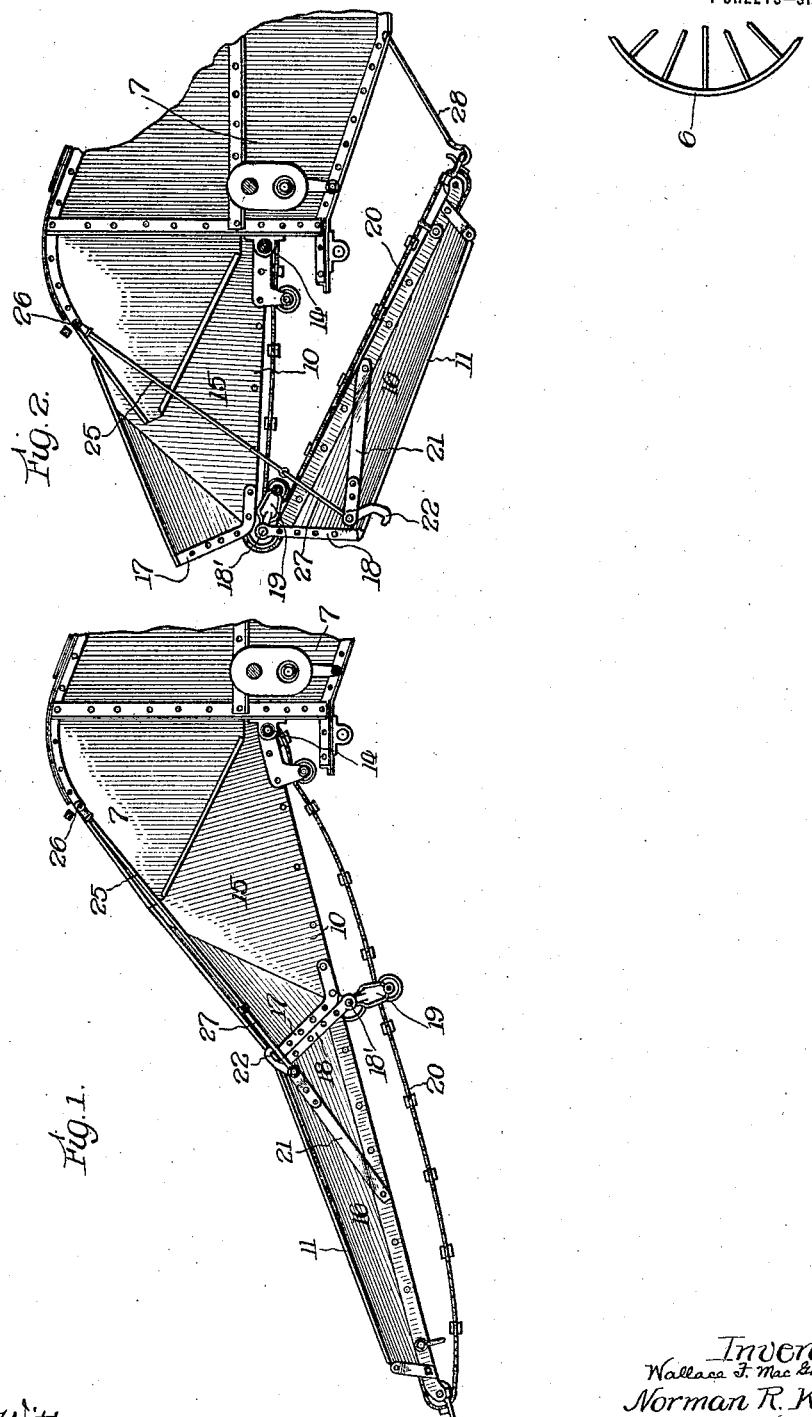

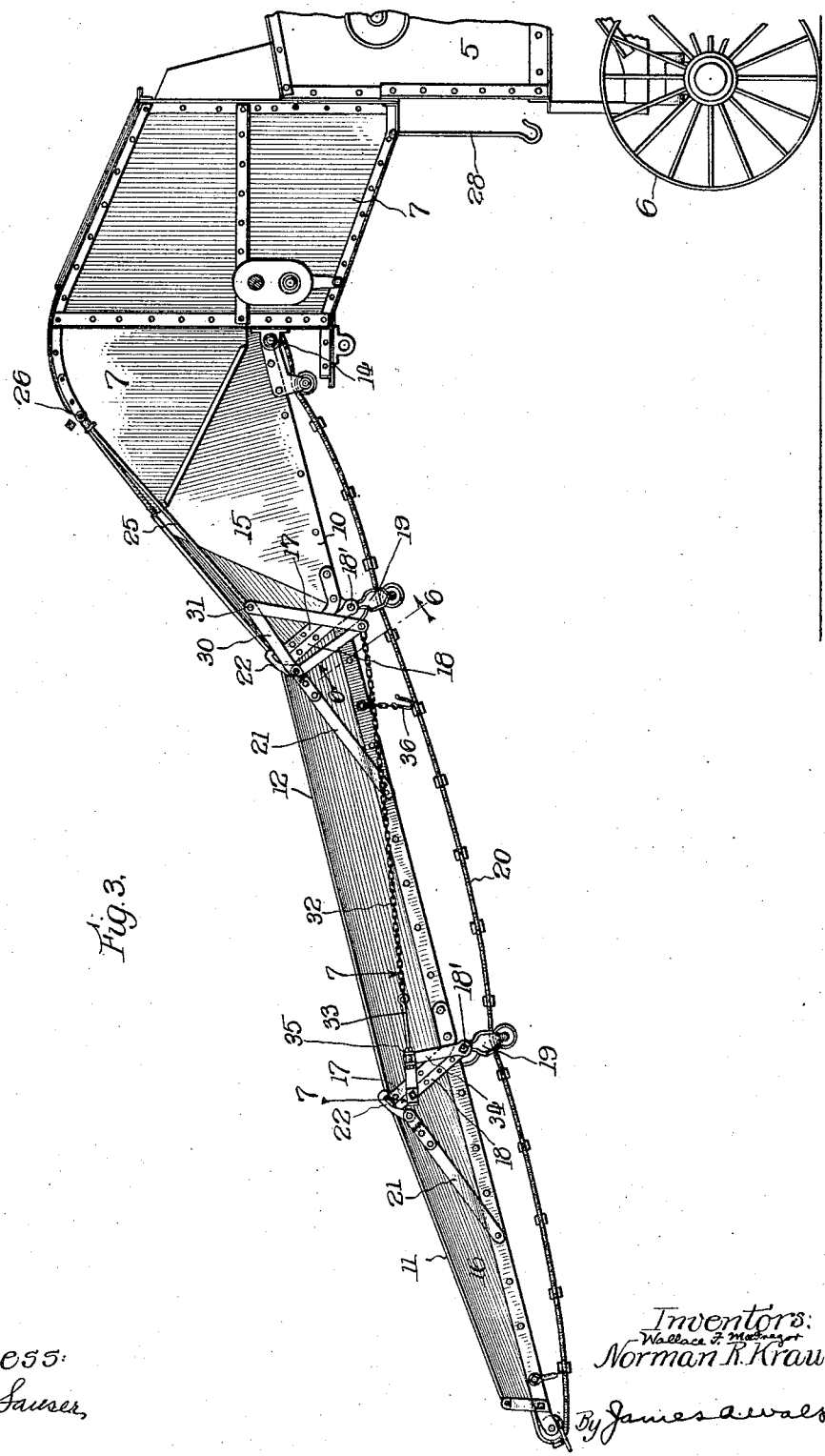

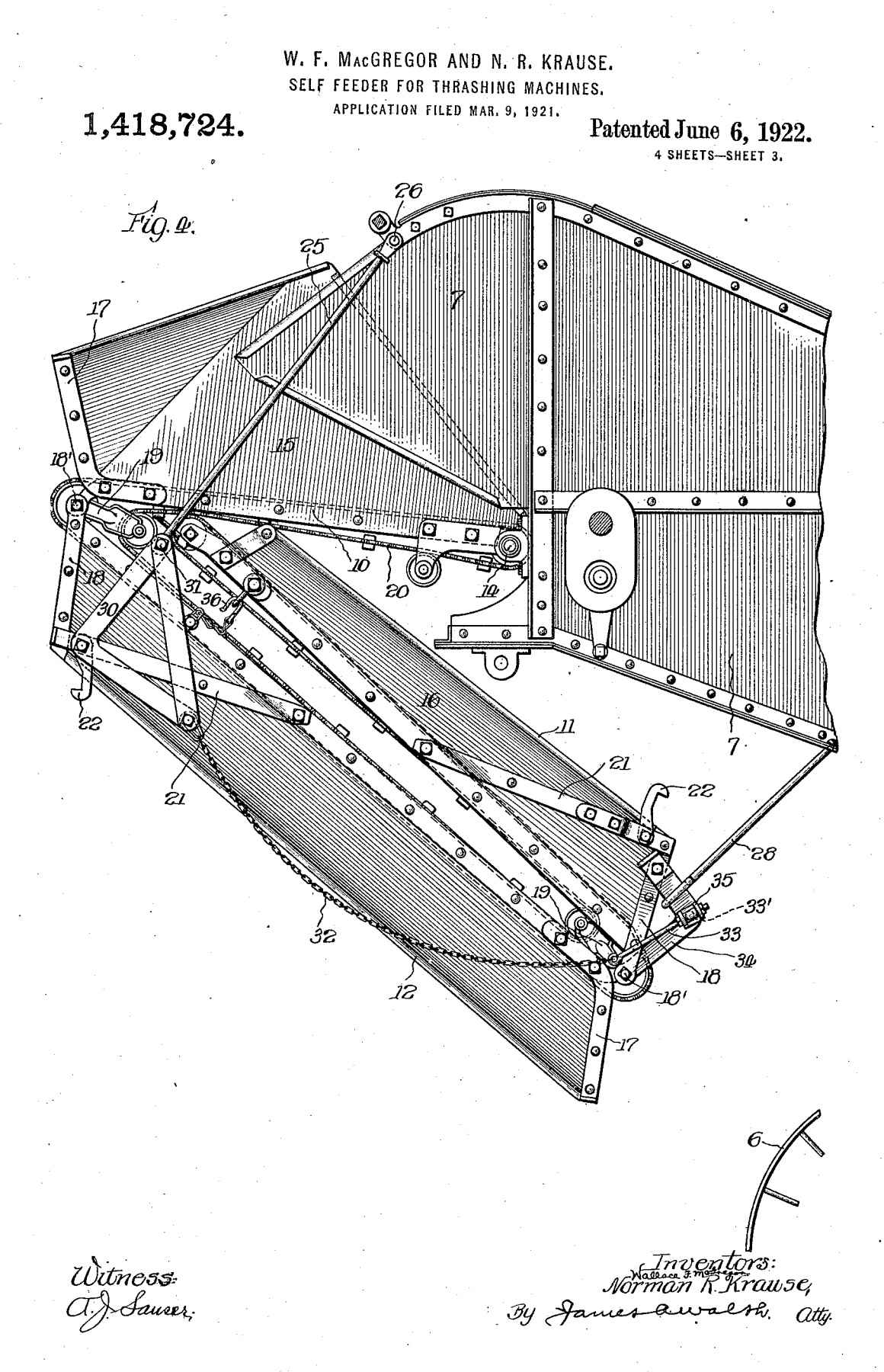

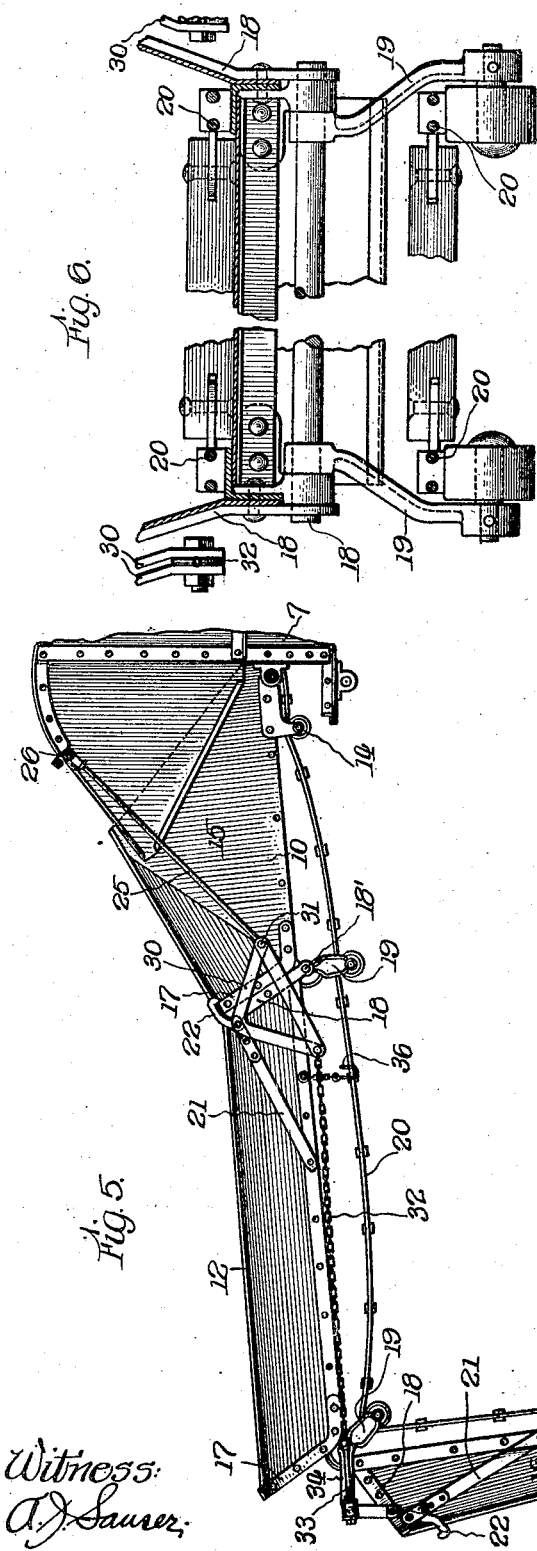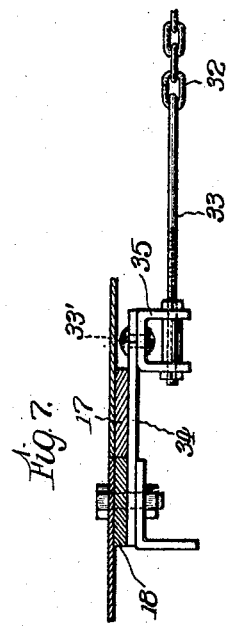

WALLACE F. MacGREGOR AND NORMAN R. KRAUSE, OF RACINE, WISCONSIN, ASSIGNORS TO J. I. CASE THRESHING MACHINE COMPANY, OF RACINE, WISCONSIN, A CORPORATION.

SELF-FEEDER FOR THRASHING MACHINES.

1,418,724.   Specification of Letters Patent.   Patented June 6, 1922.

Application filed March 9, 1921. Serial No. 450,848.

*To all whom it may concern:*

Be it known that we, WALLACE F. MACGREGOR and NORMAN R. KRAUSE, citizens of the United States, residing at Racine, in the county of Racine and State of Wisconsin, have invented certain new and useful Improvements in Self-Feeders for Thrashing Machines, of which the following is a specification.

Self-feeders for thrashing machines include a carrier for conveying bundles of grain thereto, and it is customary to provide such carriers of moderate length embodying two hinged sections, the outer one of which is adapted to fold under the inner section so that such sections may be conveniently assembled in compact form and the weight thereof brought as nearly as possible to the axle of the machine, and which arrangement avoids interference with animals employed for transporting the thrashing machine. Such type of carrier is limited in length, and, consequently, of limited capacity, and particularly when headed grain is rapidly delivered from both sides of the machine onto the carrier its restricted capacity requires considerable care so that an excess amount of material will not be carried to the feeding mechanisms, and because of the extreme looseness of such material, requiring a larger pitching surface, a larger carrier is preferred. Therefore, and especially when handling headed grain which is usually stacked in the field, it is desirable to have a large amount of feeding surface; and it is our object to materially increase the length and consequently the capacity of such feeders, but in so doing it is necessary to produce a structure which may be readily folded and which will be highly stable when the carrier sections are unfolded and extended into operable condition.

This we accomplish by our present improvements by which we are enabled to readily transform a short two-section carrier into a long three-section carrier, thus materially adding to the efficiency of such a device and also preserving its compactness when folded in relation to the thrashing machine, all as will be hereinafter more fully pointed out.

In the accompanying drawings, forming part hereof, Figure 1 is a side elevation of a two-section carrier embodying our improvements, the sections being in extended position; Fig. 2, a similar view showing the outer section folded under the inner section; Fig. 3, a side elevation of our improvement when converted into a three-section carrier; Fig. 4, a similar view showing the outer sections in folded position; Fig. 5, a side elevation showing the positions assumed by the sections when the outer section is released and swung downwardly in relation to its connected section; Fig. 6, a detail sectional view taken on the dotted line 6—6 in Fig. 5 looking in the direction indicated by the arrow, and Fig. 7 is a detail view of part of the link mechanism employed in the folding operation of the outer carrier sections.

In said drawings, the thrashing machine, 5, and carrier wheel, 6, are shown in fragment, and to the front end of which machine is secured a feeder, 7, all of which may be of any preferred form. The carrier for said feeder, when furnished as regular equipment, comprises the sections, 10 and 11, said section 10 being pivotally connected to the feeder 7, at 14, in any suitable manner. Said sections, as will be understood, are provided with the usual walls, 15, 16, and at their meeting ends may be reinforced by suitable straps, 17, 18, the latter also forming a bearing, 18', for a chain retainer, 19, for supporting the traveling slatted belt conveyer, 20, when folded. Also secured at each side of section 11 are braces, 21, upon which a latch or locking device, 22, is pivotally secured and which is adapted to be adjusted into engagement with section 10 to fixedly connect said two sections when the same are placed in extended position. Said sections are held in extended or folded relation by rods, 25, pivotally mounted, at 26, upon the feeder 7, and which rods are connected to the braces 21 by short links, 27. This rod and link connection retains the sections in extended position, as indicated in Fig. 1, and we increase the security thereof by employing said locking device 22. When it is desired to fold section 11 under section 10 in the manner shown in Fig. 2, it is but necessary to release locking device 22, when said section 11, by imparting pressure thereto, may be swung under section 10 and prevented from displacement by hooks, 28, or otherwise. When lowering such section 11, because of the peculiar location and flexibility of rods 25 and links 27, when said link is moved downwardly beyond the pivotal connection 18', there occurs a pulling action of said rods against section 11, which causes section 10 by reason of its pivotal mounting at 14, to raise gradually as section 11 is swung thereunder so that by such action section 11 freely clears the usual tongue (not shown) attached to the front end of a thrashing machine, and contact of such element is, therefore, prevented.

By the arrangement described we are enabled to provide the ordinary commercial size of carrier, which may be extended and folded in the simple manner stated. However, as indicated, it is highly desirable to employ a carrier of maximum length for accomplishing rapid thrashing in the larger wheat sections and for general convenience and efficiency in such work, primarily for the reason that with the increased capacity the grain can be rapidly delivered and distributed so that it will be constantly substantially evenly conveyed to the feeder without unduly piling the grain to an excessive depth and consequently choking the feeder, and, further, by the use of an extensible carrier the loads of grain can be hauled to each side thereof and conveniently unloaded without driving the animals attached to the wagons directly alongside the belting, pulleys and other noisily actuated mechanisms of the machine, which condition in many instances results in delays and general inefficiency where a short carrier is employed. Therefore, in order to further improve such carriers and increase the length thereof, we are enabled to install an additional section to such carriers of the type indicated in Fig. 1 which are already in use, and this we readily accomplish in the following manner. The links 27 are disconnected from rods 25 and braces 21, and section 11 is disconnected from section 10. An additional section, 12, Fig. 3, which it will be observed is of considerable length, is then connected to section 10, the same having similar reinforcing members and braces and locking devices as are applied to section 11. However, instead of links 27 which have been disconnected from rods 25 we install bell-cranks, 30, at each side of said section 12 which are pivotally mounted upon braces 21, and to the portion, 31, of such bell-cranks we pivotally connect rods 25, and to the opposite end of said bell-cranks attach a chain, 32, at the end of which we employ a link connecting mechanism, 33, pivotally mounted, at 33', in a standard, 34, secured to the reinforcing member 18 forming part of section 11, said link 33 being preferably held in a clip, 35 swiveled at 33', as plainly indicated in Fig. 7. With this additional section is furnished sufficient belt conveyer material 20 to compensate for the increased length of the carrier as a whole, consequent upon the addition of section 12. By adjusting threaded link 33 in its holding clip 35 it is possible to raise and lower sections 11 and 12 simultaneously through the action of bell-crank 30 and rod 25, as said link when shortened pulls upon said bell-crank and rod and thus exerting a raising or lifting influence on the whole carrier through its pivotal mounting at 14. These links 33, also, may be adjusted independently, so that if said carrier should become strained or lean to one side it can be squared up by adjusting the appropriate link 33. In this extensible arrangement, as indicated in Fig. 3, the sections are all secured together by the locking devices and equipment indicated. When it is desirable to fold the same in the condition shown in Fig. 4 it is but necessary to release locking devices 22 connecting sections 11, 12, and swing section 11 under section 12 and around parallel therewith so that it can be secured by hooks, 36, or otherwise, and held close to said section 12. In this movement the chain, 32, acting upon bell-cranks 30 to pull rods 25, raises section 10, and consequently section 12, so that section 11 will be free to swing downwardly without striking the ground, and when it is secured to section 12, the latter, by releasing locking device 22, is also, with section 11 attached thereto, swung around to the position shown in Fig. 4, the action of section 12 through bell-cranks 30 pulling rods 25 into the position shown in said Fig. 4, and, therefore, further raising section 10, so that the folded sections, 11, 12, clear the ground and tongue as hereinbefore indicated, and may be compactly assembled and supported as near the front separator axle as possible in the manner shown and as explained with reference to the structure indicated in Fig. 2.

In the manner explained we are enabled to provide a two-section carrier as indicated in Fig. 1, or a three-section carrier as indicated in Fig. 3, in accordance with the desire of the user when originally ordering such device, or should he originally obtain a two-section carrier and later determine to increase the length thereof this can be accomplished by obtaining section 12 and installing the same in the manner indicated. In thus providing these sections with interchangeable devices it will be readily understood that an economical plan is assured whereby the user of such carriers may shorten or lengthen the same without complication or change in construction, as by the equipments which are the subject hereof no especial tools or facilities are required to convert such a commercial form of carrier into either of the lengths desired. It is also desired to emphasize the fact that the peculiar co-relation and operation between rods 25 and the link 27 or bell-crank 30 with which it communicates produces a balancing effect upon the sections whether composed of two or three members, and in either instance the means described herein assures the ability to fold section 11 beneath section 10, or sections 11 and 12 thereunder, and simultaneously raising the same through the action of rods 25 upon pivotally mounted section 10, so that either or both such sections can be folded with but slight physical effort in the manner indicated in Figs. 2 or 4 without contacting with the ground or other parts of the machinery.

We claim as our invention:

1. In a carrier for self-feeders, a plurality of sections one of which is pivotally mounted upon said feeder and supports the other of said sections, a tension rod connected to said feeder, and interchangeable means connected to said rod and to one of said sections for decreasing or increasing the number of sections in said carrier.

2. In a carrier for self-feeders, a plurality of sections one of which is pivotally mounted upon said feeder and supports the other of said sections, a tension rod connected to said feeder, interchangeable means connected to said rod and to one of said sections for decreasing or increasing the number of sections in said carrier, and means communicating with said interchangeable means and one of said sections to permit two of such sections to be folded in relation to said supporting section.

3. In a carrier for self-feeders, a plurality of sections one of which is movably mounted upon said feeder and supports the remaining sections, a second section pivotally connected to said supporting section, means connected to said feeder and said second section to permit the latter to be swung and held beneath said supporting section, a third section pivotally connected to said second section, and means connecting said second and third sections to permit the latter to be swung and held beneath said second section.

4. In a carrier for self-feeders, a carrier section secured thereto, a second section connected to said first-mentioned section, flexible means connecting said two sections, a third section connected to said second section, a brace secured to said third section, and means connecting said brace and said flexible means to permit said third section to be swung under said second section whereby said third and second sections may by the action of said flexible means be folded upon each other and beneath said first section.

In testimony whereof we affix our signatures.

WALLACE F. MacGREGOR.
NORMAN R. KRAUSE.